US010733307B1

(12) United States Patent
Wolters et al.

(10) Patent No.: US 10,733,307 B1
(45) Date of Patent: Aug. 4, 2020

(54) TRANSPARENT INSPECTION OF RESPONSES FROM ORIGIN SERVERS TO IDENTIFY PROTECTED DATA

(71) Applicant: CLOUDFLARE, INC., San Francisco, CA (US)

(72) Inventors: Benedikt Christoph Wolters, Hurth (DE); David Kitchen, London (GB); Alex Cruz Farmer, London (GB); Andrew Galloni, Tonbridge (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/367,214

(22) Filed: Mar. 27, 2019

(51) Int. Cl.
*H04L 9/00* (2006.01)
*G06F 21/60* (2013.01)
*H04L 29/06* (2006.01)
*H04L 29/08* (2006.01)

(52) U.S. Cl.
CPC ........ *G06F 21/604* (2013.01); *H04L 63/1416* (2013.01); *H04L 63/1425* (2013.01); *H04L 67/10* (2013.01); *H04L 67/26* (2013.01); *H04L 67/32* (2013.01); *H04L 67/42* (2013.01)

(58) Field of Classification Search
CPC ........ H04L 67/26; H04L 67/32; H04L 67/42; H04L 67/10; H04L 63/14216; H04L 63/1425; G06F 21/604
See application file for complete search history.

(56) References Cited

U.S. PATENT DOCUMENTS

| 2010/0121903 | A1* | 5/2010 | St. Pierre | G06F 21/554 709/202 |
| 2013/0232576 | A1* | 9/2013 | Karnikis | G06F 21/56 726/24 |
| 2016/0036848 | A1* | 2/2016 | Reddy | H04L 63/0227 726/22 |
| 2018/0218145 | A1* | 8/2018 | Hussain | H04L 63/0876 |

OTHER PUBLICATIONS

IEEE 802.11-2016, "Wireless LAN Medium Access Control (MAC) and Physical Layer (PHY) Specifications," approved Dec. 7, 2016, 3534 pages.
Kozlov, R., "Identifying and alerting on data loss using Cloudflare Workers," CLOUDFLARE Blog, Aug. 30, 2018, downloaded from https://blog.cloudflare.com/identifying-and-alerting-on-data-loss-using-workers/ on Mar. 25, 2019, 6 pages.

* cited by examiner

*Primary Examiner* — Beemnet W Dada
(74) *Attorney, Agent, or Firm* — NDWE, LLP (57) ABSTRACT

A compute server receives a request from a client device, where the plurality of compute servers are part of a distributed cloud computing platform, and wherein the request is a request for a network resource. The compute server executes, by a single process at the first compute server, a response inspector, wherein the response inspector is run in a one of a plurality of isolated execution environments. The compute server receives at least one content item from an origin server in response to the request for the network resource. The compute server detects a protected content marker in the at least one content item that indicates a data breach, and logs information about the request in an inspection log.

21 Claims, 6 Drawing Sheets

```
CONTENT ITEM

<HTML>
<meta secret="dontletthisout">

<script>
   var a = 'b';
   a = a + 1
</script>

<body>
Blahblahblah blog
</body>

</HTML>
```

ISOLATED EXECUTION ENVRIONMENT MODEL

FIG. 5

VIRTUAL MACHINE MODEL

TRANSPARENT INSPECTION OF RESPONSES FROM ORIGIN SERVERS TO IDENTIFY PROTECTED DATA

FIELD

Embodiments of the invention relate to the field of network computing; and more specifically, to a cloud computing platform that inspects content in responses from origin servers at proxy servers in a distributed cloud computing network.

BACKGROUND

Historically, the use of web application code has been split between origin servers and browsers that are connected to one another by a network that transmits data from point to point. Initially, large websites and web applications were first run on large physical mainframe servers that could handle large traffic loads and large data transfers. Over time a switch was made to provide websites and web applications to be deployed on tens to hundreds of commodity servers that allowed for a reduction in cost, more fault tolerance, and increased performance. This technology is referred to as cloud computing. The technology for providing web applications further evolved to utilize virtual machines where one physical machine could be split into multiple virtual machines that can be independently managed. Virtual machines typically have a high overhead cost in terms of compute resources. For instance, each virtual machine is typically allocated hundreds of megabytes of random-access memory (RAM) and typically takes tens of seconds to boot. Virtual containers can be used to provide isolation between customers of the cloud computing platform and are less resource intensive than virtual machines. However, web application code running in a container typically is run in its own operating system (OS)-level process, consuming RAM, and inducing context-switching overhead. While native code can load quickly in a container, many server-oriented language execution environments are not optimized for startup time.

Some cloud computing platforms instantiate a containerized process for customer code and auto-scale the process which creates cold-starts. A cold-start occurs when a new copy of the code starts on a physical machine. When a new containerized process is instantiated, it can take between hundreds of milliseconds to multiple seconds (e.g., between 500 ms to 10 seconds) to complete. This means that any request to be serviced by the code to be executed in a container may be waiting for as much time as it takes to start execution of the new containerized process (e.g., for as much as ten seconds). Also, this containerized process can only process a single request at a time and a new containerized process must be cold-started each time an additional concurrent request is received. This means that each such request to be serviced by a new container can experience significant lag that does not improve over time. If the containerized process does not receive a request to be processed within a certain amount of time, it will automatically terminate and a new containerized process will need to be cold-started again once a request is received. When new customer code is deployed, this entire process proceeds again as each containerized process needs to be instantiated anew.

In these complex cloud computing platforms, security can be difficult to maintain. Unauthorized access of customer data in cloud computing platforms, referred to as a 'data breach,' is a security hazard for modern cloud computing platforms. However, detecting such data breaches is difficult. Customers and administrators of cloud computing platforms are often unaware of data breaches until the stolen data is utilized for malicious purposes. Most efforts to improve security are aimed at correcting holes in the cloud computing security that enable access. However, the speed at which such corrections can be made is limited by a lack of knowledge of the timing of data breaches and a lack of information about the lost data.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus that provides a response inspector in a distributed cloud computing network is described. The distributed cloud computing network includes multiple compute servers that are geographically distributed (e.g., in different locations throughout the world). There may be hundreds of compute servers that are geographically distributed in different points-of-presences (PoPs). Each PoP may include one or more physical servers (e.g., one or more compute servers, one or more control servers, one or more domain name system (DNS) servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) including response inspection via a response inspector that is executed at the compute servers.

The response inspector is executed as a third-party code at the PoP to inspect the responses being returned to client devices at the PoP. The response inspector examines the network resources associated with responses including the content items (e.g., web pages, scripts, images and similar content items) that make up these network resources to identify a protected content marker. The protected content marker identifies content that has been accessed improperly and without proper authorization. The response inspector can log information about the content items that have been improperly accessed and generate a notification that is sent to a customer (e.g., an administrator of the origin server) that has provided the improperly accessed content item.

Third-party code (e.g., code written by or deployed by third-parties such as customers of the cloud computing platform) can be deployed to all or some of the compute servers of the distributed cloud computing network. The third-party code can be, for example, a piece of JavaScript or other dynamically-typed language, a WebAssembly (WASM) compiled piece of code, or other compiled code. In an embodiment, the third-party code is compliant with the W3C standard ServiceWorker application programming interface (API). The third-party code can, for example, intercept and answer hypertext transfer protocol (HTTP) requests and make outgoing HTTP subrequests as part of answering an HTTP request. For purposes of this description, each piece of third-party code is referred to as a worker script and an executed instance of the worker script is referred to as a worker. According to some embodiments, the response inspector is implemented as a worker script or a function of a worker script.

A worker script of a particular third-party is run in an execution environment in which a single process can safely run third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific example implementation, the worker script is run in an isolate of the V8 JavaScript engine.

Because a single process can run multiple isolated execution environments, the overhead of running the isolated execution environments is incurred once (e.g., starting the single process to run the isolated execution environments) and isolated execution environments can be started and run with very little individual overhead. The worker scripts are not executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like those experienced with other cloud computing platforms which means that more time is spent running the code instead of performing context switches. Also, because the implementations of the single process are shared between all isolated execution environments, the memory requirements are less than traditional cloud computing platforms.

In an embodiment, a particular response inspector is loaded as a part of a worker script and executed on-demand (when and only if it is needed) at a particular compute server of the distributed cloud computing network. Each request for a content item that triggers handling of a response by a response inspector is handed by the response inspector at the compute server that is closest to the requesting client device. For instance, when responding to a client device in New Zealand, a response inspector and worker script is run in a compute server in New Zealand that is closest to the client device. The compute server that receives the request may be determined by the network infrastructure according to an Anycast implementation or by a geographical load balancer.

Figure 1:
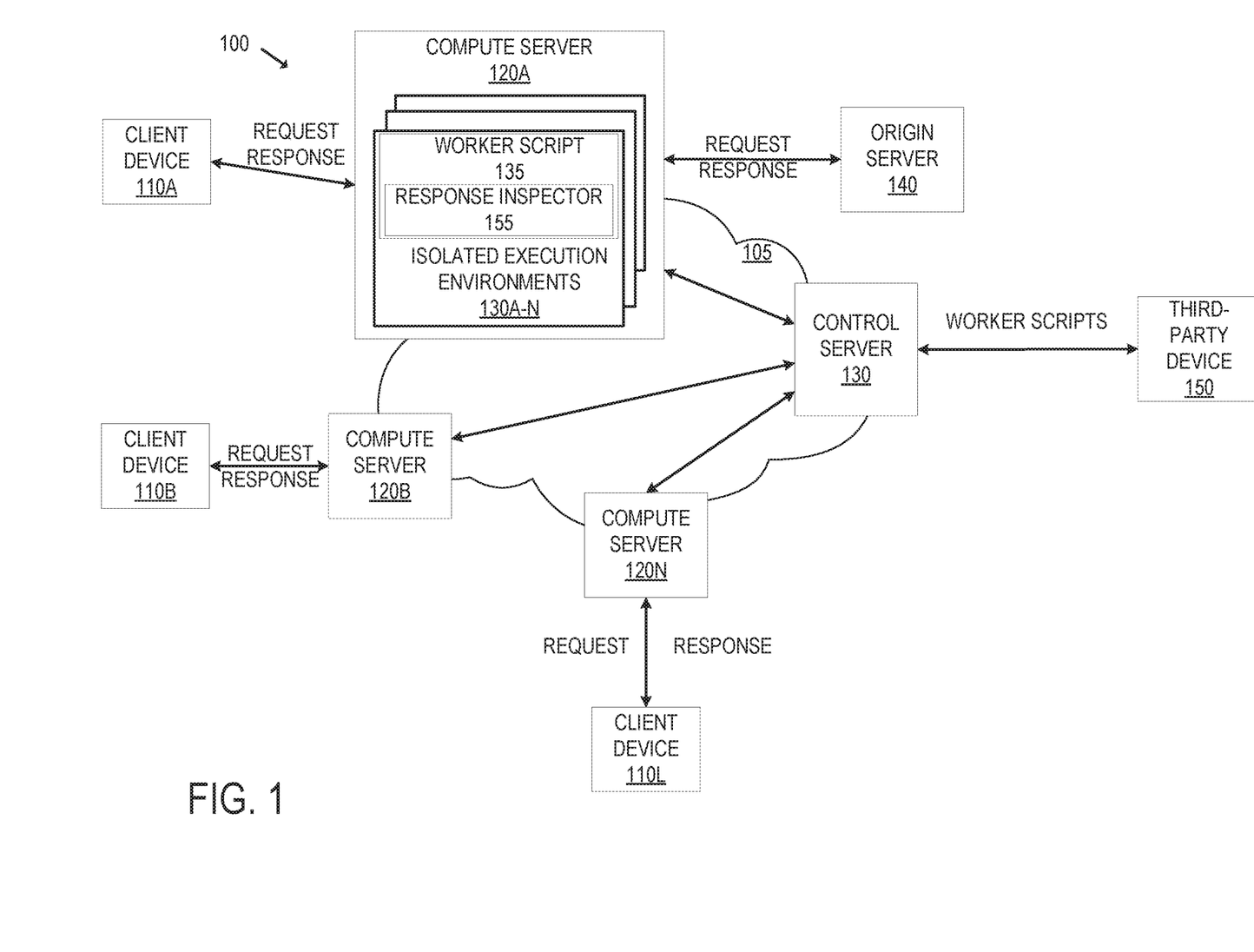
FIG. 1 illustrates an exemplary embodiment of a cloud computing platform that executes a response inspector in a distributed cloud computing network according to an embodiment.

FIG. 1 illustrates an exemplary embodiment of a cloud computing platform that executes the response inspector in a distributed cloud computing network according to an embodiment. The cloud computing platform can also provide different services in addition to the response inspector such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110A-L, the compute servers 120A-N, the control server 130, the origin server 140, and the third-party device 150.

Each client device 110A-N is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the cloud computing platform. The compute servers 120A-N are physical servers and can be geographically distributed (e.g., in different locations throughout the world). The compute servers 120A-N are part of the distributed cloud computing network 105. There may be hundreds of compute servers as part of the cloud computing platform. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices in the cloud computing network between the compute servers 120A-N such as routers, switches, and other intermediate computing devices.

The control server 130 is operated by the cloud computing platform and provides a set of tools and interfaces for a customer to, among other things, configure code to run in the cloud computing platform. For instance, the control server 130 may allow the customer to upload one or more worker scripts and may allow the customer to specify when the worker script(s) are to be run. For instance, the customer may configure a response inspector 155 that identifies protected content markers in responses returned by the origin server 140. By way of example, the control server 130 may allow the customer to configure a specific set of protected content markers as matching patterns that can be strings, watermarks, security tokens, and similar markers that the response inspector will search for in the responses from the origin server. The control server 130 may allow the customer to delete and update previously uploaded response inspectors or to modify the configuration of already uploaded response inspectors. The control server can also provide tools to enable the customer to control the actions taken when a protected content marker is identified.

The control server 130 deploys each response inspector to each of the compute servers 120A-N automatically (without the customer selecting which of the compute servers 120A-N in which to deploy the worker script). In another embodiment, the control server 130 allows the customer to indicate which of the compute servers 120A-N are to be deployed a particular response inspector or specific protected content markers. The control server 130 creates an identifier for each response inspector worker script. In an embodiment, the identifier is created by hashing the content of the response inspector (e.g., using a cryptographic hash function such as SHA-256), where two scripts with identical content will have the same identifier even if uploaded by different customers and even if applied to different zones.

In an embodiment, the control server 130 allows a customer to provision the response inspection service to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers. Pointing the DNS or similar records to the compute server 120A enables the compute server to act as a proxy for requests directed to the origin server. In this manner, the requests for content items sent to the origin server and the responses thereto pass through the computer server and enable the response inspector to examine the responses.

The third-party device 150 is a computing device (e.g., laptop, workstation, smartphone, mobile phone, tablet, etc.) that is used by third-parties to, among other things, configure their response inspector to run in the cloud computing platform. A third-party may be a customer of the cloud computing platform and/or a party that is configuring response inspector code to run in the cloud computing platform on behalf of the customer.

The origin server 140, which may be owned or operated directly or indirectly by the customer of the cloud computing platform, is a computing device on which a network resource resides, is generated, and/or otherwise originates (e.g., web pages, images, word processing documents, PDF files movie files, music files, or other content items). In an embodiment, the origin server 140 is not required to be in the cloud computing platform (e.g., response inspector code may run on the compute servers without communicating with an origin server). Although FIG. 1 illustrates the origin server 140 communicating with the compute server 120A, the origin server 140 may also communicate with one or more of the other compute servers 120N. Similarly, while FIG. 1 illustrates a case with a single origin server, the cloud computing platform can service any number of origin servers each with separate response inspectors distributed to the compute servers.

The compute servers 120A-N can be geographically distributed which decreases the distance between requesting client devices and the compute servers and decreases the time necessary to respond to a request. The compute servers 120A-N may operate as a reverse proxy and receive requests for network resources (e.g., HTTP requests) of a domain of the origin server 140. The particular compute server 120 that receives a request from a client device may be determined by the network infrastructure according to an anycast implementation or by a geographical load balancer. For instance, the compute servers 120A-N may have a same anycast Internet Protocol (IP) address for a domain of the origin server 140. If the origin server 140 handles the domain "example.com," a domain name service (DNS) request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A, the client device 110B is closest to the compute server 120B, and the client device 110L is closest to the compute server 120N. Accordingly, requests from the client device 110A are received at the compute server 120A, requests from the client device 110B are received at the compute server 120B, and requests from the client device 110L are received at the compute server 120N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute the worker script(s) of a third-party such as the response inspectors of customers. Each worker script is run in an isolated execution environment, such as running in an isolate of the V8 JavaScript engine. Thus, as illustrated in FIG. 1, the compute server 120A includes the isolated execution environments 130A-N that each executes a separate worker script 135. The isolated execution environment 130A-N are run within a single process. The worker scripts are not executed using a virtual machine or a container. In an embodiment, a particular worker script, e.g., a worker script implementing a response inspector, is loaded and executed on-demand (when and only if it is needed) at a particular compute server of the distributed cloud computing network. Each request for a domain can trigger handling by a response inspector and other worker scripts that will handle the request and response at the compute server that is closest to the requesting user.

The response inspector 155 is a worker script or worker that is executed on behalf of a customer at compute server to identify content items that have been improperly accessed and thereby detect data breaches. The operation of the response inspector is discussed herein below in further detail with reference to FIGS. 3 and 4. The response inspector searches content items returned by an origin server as a response to a request for a network resource from a client device. When the response inspector identifies a content item with a protected content marker, then the response inspector can log the content item and, in some cases, cause a notification to be sent to the customer. In some embodiments, the response inspector prevents the content item from being returned to the client device depending on customer configuration of the response inspector. The log can be maintained at the control server and notifications can similarly be generated in response to log entry generation at the control server. In other embodiments, the log can be stored in any location accessible to the response inspector in the cloud computing platform. Notifications can be sent by each response inspector to the customer or can be aggregated at the control server or similar location.

Figure 2:
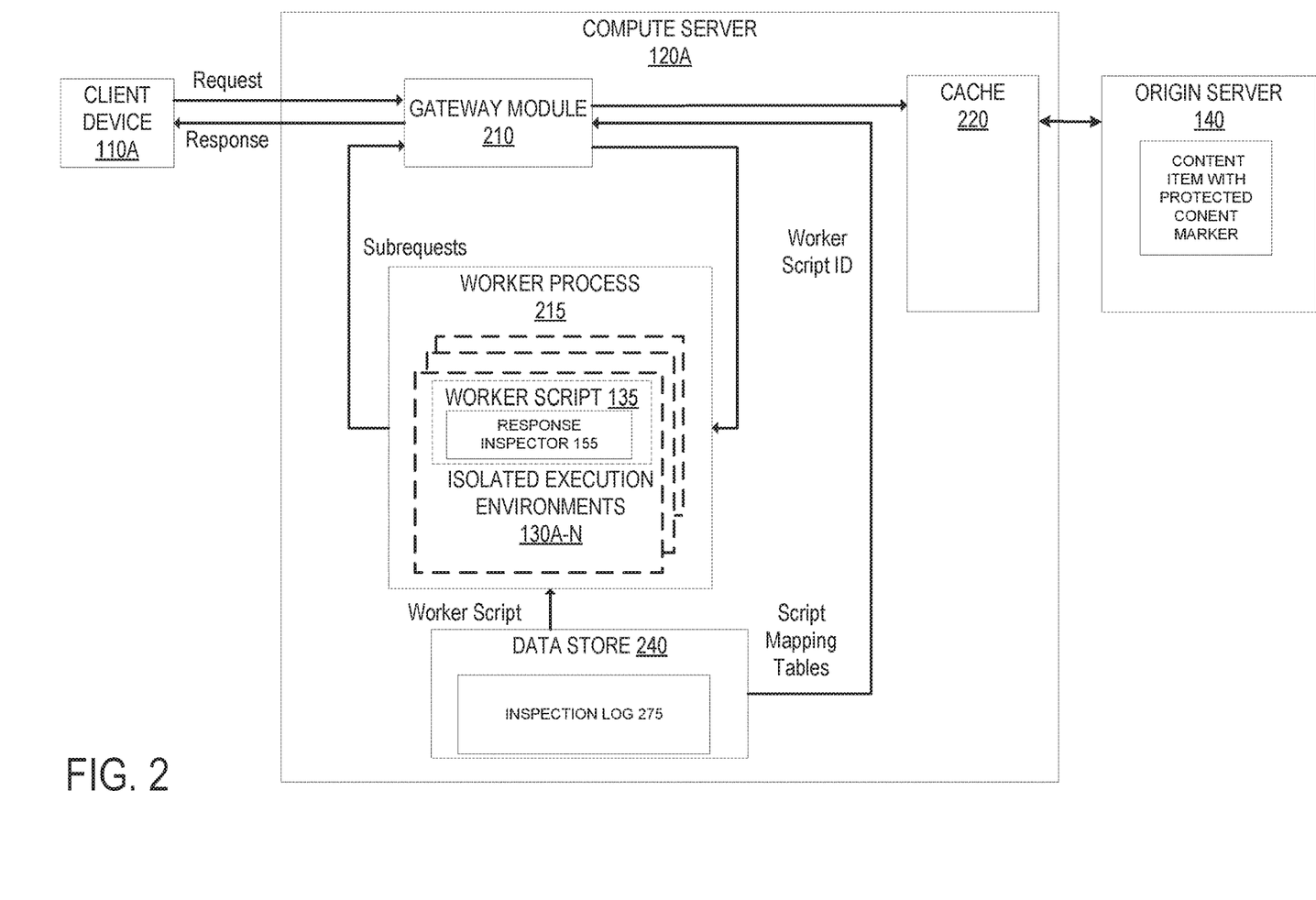
FIG. 2 illustrates an example of a compute server that executes a response inspector according to one embodiment.

FIG. 2 illustrates an example of a compute server 120 according to an embodiment. The compute server 120A includes a gateway module 210, a worker process 215, a cache 220, and a data store 240. The gateway module 210 receives web requests and processes web responses (e.g., HTTP requests and HTTP responses). The gateway module 210 may be acting as a reverse proxy for the origin server 140. The gateway module 210 has access to the cache 220 that is configured to cache network resources (e.g., web pages, images, word processing documents, PDF files movie files, music files, or similar computer files), configuration files, scripts, and/or other content items. The data store 240 is configured to store, among other items, the worker scripts such as the response inspector that are received from the control server 130.

Each worker process 215 is a single process that executes the isolated execution environments 130A-N. There may be hundreds to thousands of isolated execution environments that are run simultaneously by the worker process 215. Each different worker script 135, such as the response inspector 155, is run by a different one of the isolated execution environments 130A-N each with its own heap or similar memory structure. The worker process 215 starts an isolated execution environment to load a particular worker script on the first use of the worker script. Depending on the complexity of the worker script, loading the worker script may take approximately tens to hundreds of milliseconds of processor time. A worker script stays loaded in memory between requests so that the worker script can be used to respond quickly when a new request that triggers that worker script arrives. Handling a single request for a worker script that is already loaded typically takes a fraction of a millisecond of processor time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during the booting of the compute server 120A or when the first worker script is triggered for execution.

The gateway module 210 receives a request from the client device 110A. The request may be an HTTP request for a zone of the customer. A zone is a subset of a set of resources of the distributed computing platform. The gateway module 210 processes the request including determining whether the request triggers executing of a worker script such as the response inspector. For instance, the gateway module 210 analyzes a uniform resource locator (URL) in the request against the URL matching pattern configured for the zone to determine if a worker script such as the response inspector is to be executed. If a worker script is to be executed, the gateway module 210 annotates the request with the identifier of the worker script to be executed as determined by a script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates the response after the worker script(s) are executed. If the identified worker script is not loaded, the worker process 215 creates an isolated execution environment and loads and executes the worker script.

The executed worker script can take various actions depending on how the script is written. The worker script may make one or more further requests (referred herein as "subrequests") such as additional HTTP requests. These subrequests may be destined for the origin server 140 or to other destinations on the internet. The worker process 215 sends the subrequests back to the gateway module 210 for further processing. The gateway module 210 is configured to prevent the subrequest from looping back to the same worker script. But, the subrequest may trigger a different worker script potentially from a different zone. If the subrequest is to the same zone, the gateway module 210 transmits the subrequest to the origin server 140 for processing and receives the response from the origin server 140. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. In the embodiments where a response inspector is among the triggered worker scripts, an example scenario is a customer that has a service to provide a complex website with images, forms, scripts, and similar content items. The user of a client device sends an HTTP request for a webpage. The gateway module 210 instantiates worker scripts to retrieve the web pages as well as the related content items. The response inspector is also instantiated. The origin server responds to the requests from the gateway module and sub-requests for specific content items. The response inspector makes a copy and searches each of the content items to identify protected content markers. If a protected content marker is identified then the response inspector can record the information related to the protected content marker in the inspection log 275. The response inspector can subsequently send updates to the inspection log to the control server and notifications of changes to the inspection log to the customer.

Figure 3:
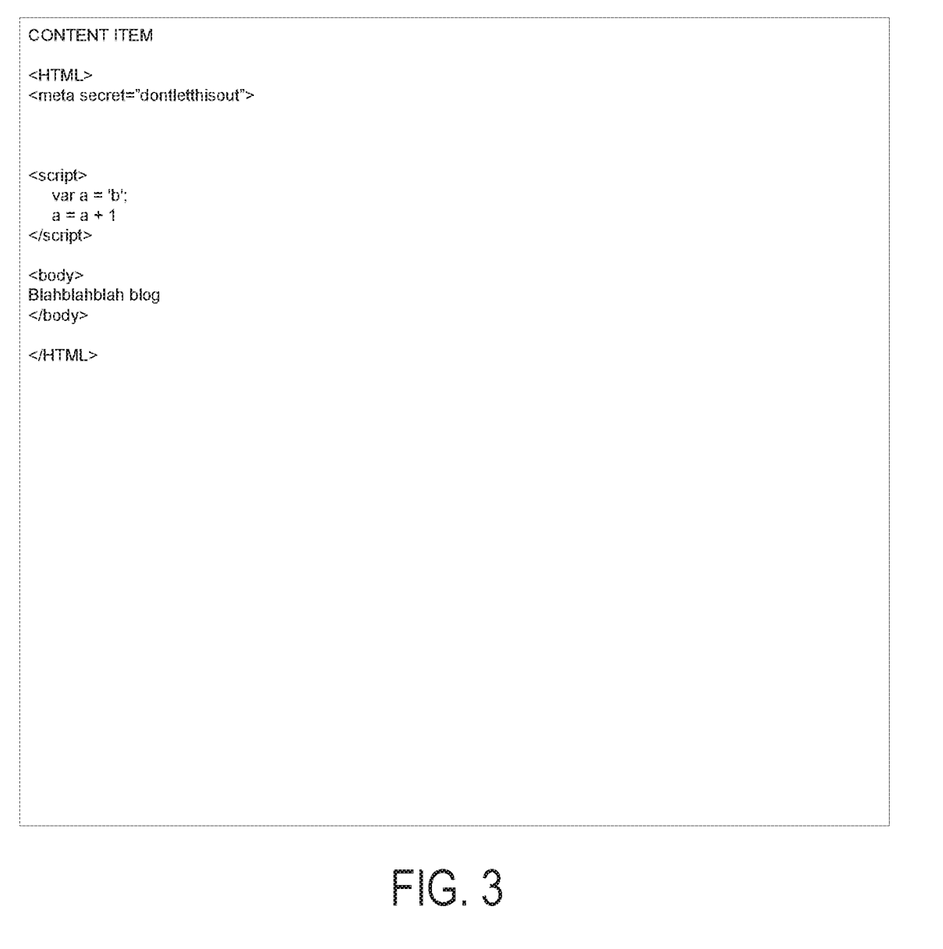
FIG. 3 is an example web page with a protected content marker according to one embodiment.

FIG. 3 is a diagram of an example web page with a protected content marker. In this example, a basic webpage is shown. A protected content marker is placed in a <meta> tag (e.g., secret='dontletthisout'>. The content item can include other content including scripts, text and similar content. In this example, the protected content marker is a text string, however, in other embodiments, any unique data can be utilized to identify a content item as protected. Examples of protected content markers can include text strings, watermarks, tokens, schema definitions (e.g., Java Script Object Notation (JSON) schema or Extensible Markup Language (XML) document type definition (DTD)) or similar information. In some embodiments, a format or structure of a content item serves as a protected content marker (e.g., data in a format or structure of credit card information). A content item that is protected should not be present outside of the origin server. A content item that is accessed by an authorized user will have any protected content marker removed. Content items with protected content markers that are never intended to be shared outside of the origin server can also be utilized. In any case where a content item with a protected content marker in the content item is encountered by the response inspector a data breach has occurred and the customer can be notified. In some embodiments, the response inspector will not act to interrupt the retrieval of the content item and functions solely for detection of data breaches. This configuration can be utilized to prevent false positives from blocking a legitimate access of data. In other embodiments, the response inspector can block a response from being sent to a requestor where the content items with protected content markers are detected.

Figure 4:
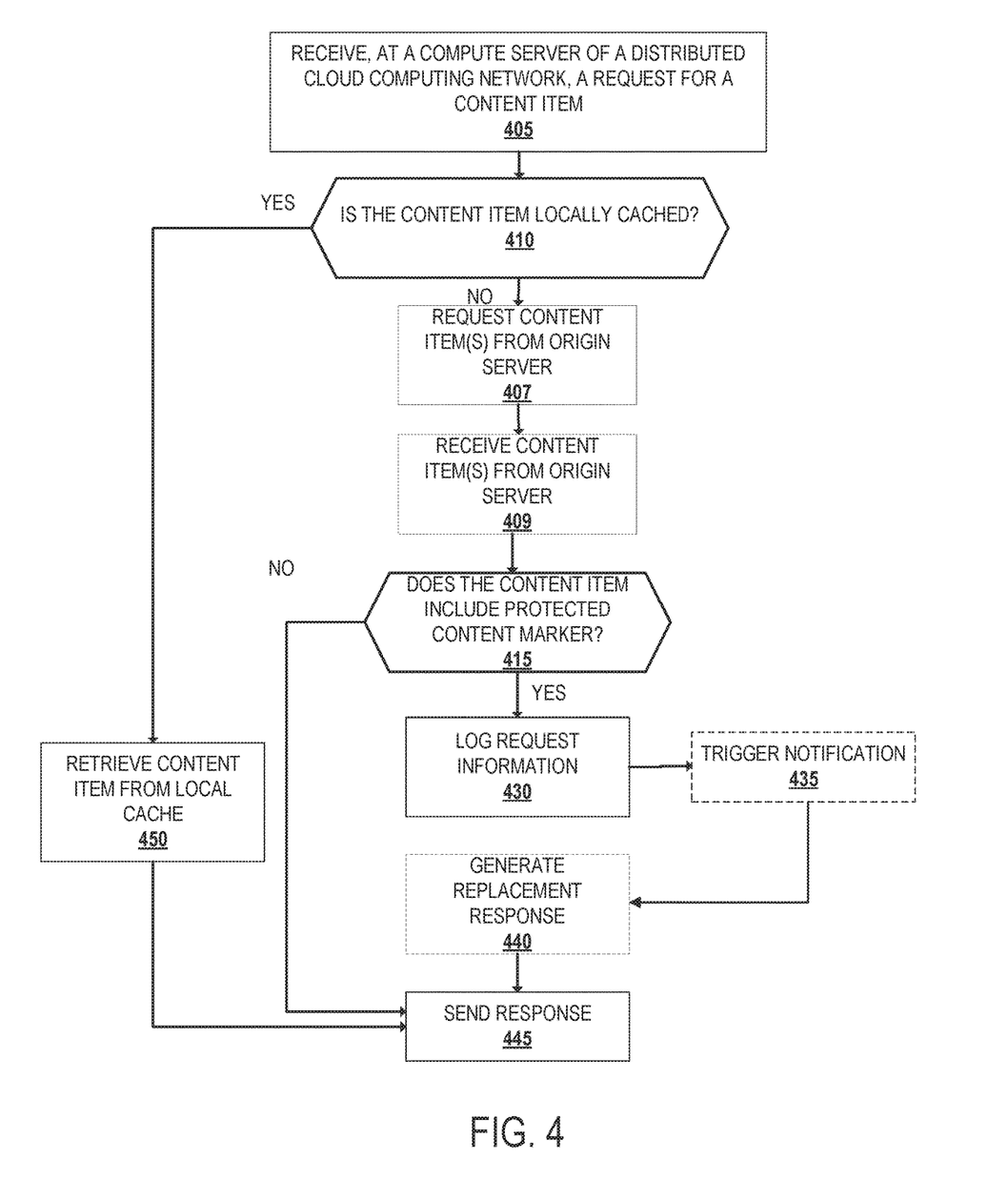
FIG. 4 is a flow diagram that illustrates exemplary operations for executing a response inspector in a distributed cloud computing network according to an embodiment.

FIG. 4 is a flow diagram that illustrates exemplary operations for executing a response inspector in a distributed cloud computing network according to an embodiment. The operations of FIG. 4 are described with respect to the exemplary embodiment of FIGS. 1 and 2. However, the operations of FIG. 4 can be performed by different embodiments than those of FIG. 1 and, and the embodiment described in FIGS. 1 and 2 can perform operations different than those of FIG. 4. The operations of FIG. 4 will be described with respect to HTTP/S requests and responses. But, the operations of FIG. 4 can be performed with different types of network resource requests and responses.

At operation 405, a first one of multiple compute servers of a distributed cloud computing network receives a request that triggers execution of a response inspector. The request may be received from a client device and be an HTTP or HTTPS request, for example, destined for a zone. The response inspector is one of multiple worker scripts that can be executed by the first compute server in response to the request. The response inspector may be a third-party code piece (written and/or provided by an owner or operator of the zone). The response inspector can be, for example, a piece of JavaScript or other dynamically-typed language, a WASM compiled piece of code, or other compiled code. The first compute server may determine that the request triggers execution of the response inspector by matching the zone to a predetermined matching pattern that associates the response inspector to the predetermined matching pattern. For instance, the compute server may analyze a URL identified in a received HTTP request against a URL matching pattern configured for the zone to determine if a working script is to be executed and if so, which working script, e.g., the response inspector. With respect to FIG. 1, the compute server 120A receives a request from the client device 120A that triggers execution of a working script such as the response inspector. In one example, the HTTP request is an HTTP GET method for "example.com," which matches a predefined matching pattern to apply to a response inspector that searches for protected content markers specific to example.com domain.

The distributed cloud computing network includes multiple compute servers including the first compute server. The compute servers are geographically distributed. There may be hundreds or more compute servers. In an embodiment, each of the compute servers are anycasted to a same IP address, and the first compute server receives the request in operation 405 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to it.

In an embodiment, each of the compute servers of the distributed cloud computing network includes the working scripts such as the response inspector. The response inspector code can be deployed to each of the compute servers without the owner or operator of the zone selecting which of the compute servers are to receive and potentially run the response inspectors. In an alternative embodiment, the owner or operator of the zone selects which of the compute servers are to receive and potentially run the response inspectors.

Next, at operation 410, a single process of the first compute server determines whether network resources requested are locally cached or cached in the set of compute servers. If the requested network resources are locally cached, then at operation 450, the locally cached content is returned to the requesting client device. In cases where the requested network resources are locally cached, the response inspector is not invoked since the availability in the local cache indicates a prior authorized access of the network resource by the same requestor such that the subsequent access to the network resource is permitted. In this case, the requested network resource and its component content items are retrieved and a response is sent to the client device at operation 440.

In some embodiments, the cache can be purged at the time that the response inspector is initiated to prevent possible data breaches from already cached content items.

If the requested network resources are not locally cached, then the gateway module causes the execution of the response inspector in a first isolated execution environment. Multiple other working scripts can also be started by the gateway module and executed by the single process in multiple other isolated execution environments respectively. Code of a working script in one isolated execution environment cannot interfere with code running in a different execution environment despite being in the same process. The response inspector code can be triggered to execute for different zones and different customers. The isolated execution environment is managed in user-space rather than by an operating system. Data cannot be shared or moved across isolated execution environments (each isolated execution environment has a completely separate state). The single process on the compute server can run multiple isolated execution environments (e.g., hundreds to thousands) seamlessly switching between them. Each isolated execution environment uses its own mechanism to ensure safe memory access, such as preventing the code from requesting access to arbitrary memory (restricting its use to the objects it has been given) and/or interpreting pointers within a private address space that is a subset of an overall address space. In a specific implementation, the working scripts such as the response inspector code is run in an isolate of the V8 JavaScript engine.

In an embodiment, the response inspector code is loaded and executed on-demand (when and only if it is triggered to execute). That is, the response inspector code will not be loaded into memory until and unless a request triggers it for execution. The response inspector code stays loaded in memory (at least for a certain amount of time) between requests so that the response inspector code can be used to respond quickly if a new request is received that triggers execution of that same response inspector. An eviction process may evict working scripts such as the response inspector in a least recently used fashion. If the response inspector is not already loaded in memory and/or an isolated execution environment is not running in which to execute the response inspector, an isolated execution environment is created, and/or the response inspector is loaded to memory. Loading the response inspector code may take approximately tens to hundreds of milliseconds of processor time.

At operation 407, the execution of the response inspector and other working scripts that are processing a request may cause a set of sub-requests to be generated to retrieve each of the content items that are a part of a requested network resource. A subrequest is an additional request such as an additional HTTP request. The subrequest can be destined for the origin server of the zone or can be destined to a different server on the internet. If the subrequest is for the zone, the first compute server is configured to prevent the subrequest from looping back to the same first piece of code. Instead, the first compute server transmits the subrequest to the origin server for processing. Each sub-request will cause a separate response to be sent to the compute server. For example, where a web page is identified in an initial HTTP GET request, a set of sub-requests to retrieve additional content items such as images and scripts that are associated with the requested web page can be generated.

If the subrequest is for a different zone than that handled by the first compute server (e.g., a DNS request for an address record of the different zone returns an anycasted IP address of the compute servers), the subrequest can be processed by the first compute server directly (without the subrequest being transmitted to another compute server, for example). Processing of this subrequest may trigger a different working script, e.g., a separate response inspector, to be executed. If the subrequest is for a different zone that is not handled by the first compute server (e.g., a DNS request for an address record of the different zone does not return an IP address of the first compute server), the compute server transmits the subrequest to that different server. In an embodiment, a response inspector can be limited to handling a predefined number of subrequests. A header stores a number that counts the number of subrequests and if it exceeds the limit, the subrequest will not be processed. Additional sub-requests can be handled by initiating another response inspector.

Next, at operation 409, the first compute server receives a set of responses from the origin server with each of the content items requested via the set of sub-requests or via a single request. The content items can be any type of file including text, HTML, script, video, image, audio file, or similar types of content items. As each of the content items is provided via response the response inspector analyzes or searches the content item to identify any protected content markers that are embedded therein at operation 415. If no protected content markers are found, then the process completes by the generation and sending of a response with the requested network resources including the returned content items at operation 445.

If any content items are found to include a protected content marker, then the process logs request information at operation 430. The logged information can include any information about the request and the content items that included the protected content marker. This information can be logged locally in an inspection log and/or can be reported to a centralized or remote logging system at the control system or similar location. In some embodiments, the recording of the detected protected content marker triggers a notification to a customer associated with the origin server from which the protected content marker was received at operation 435. In other embodiments, a separate notification is not sent and the customer can inspect the logs to review the data breaches. In some embodiments, the process can generate a replacement response at operation 440 to take the place of a response with the requested network resources to protect the network resources and content items with the protected content marker at operation 440. The replacement response can be an error message or can return alternate content to mask the detection of the data breach. The replacement response or the actual response can then be sent to the client device at operation 445. The process of the response inspection can be triggered again at any time by further requests at operation 405.

Running third-party code such as a response inspector in isolated execution environments improves the performance as compared with running code using a virtual machine or a container. Unlike other computing platforms that instantiate a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches.

Figure 5:
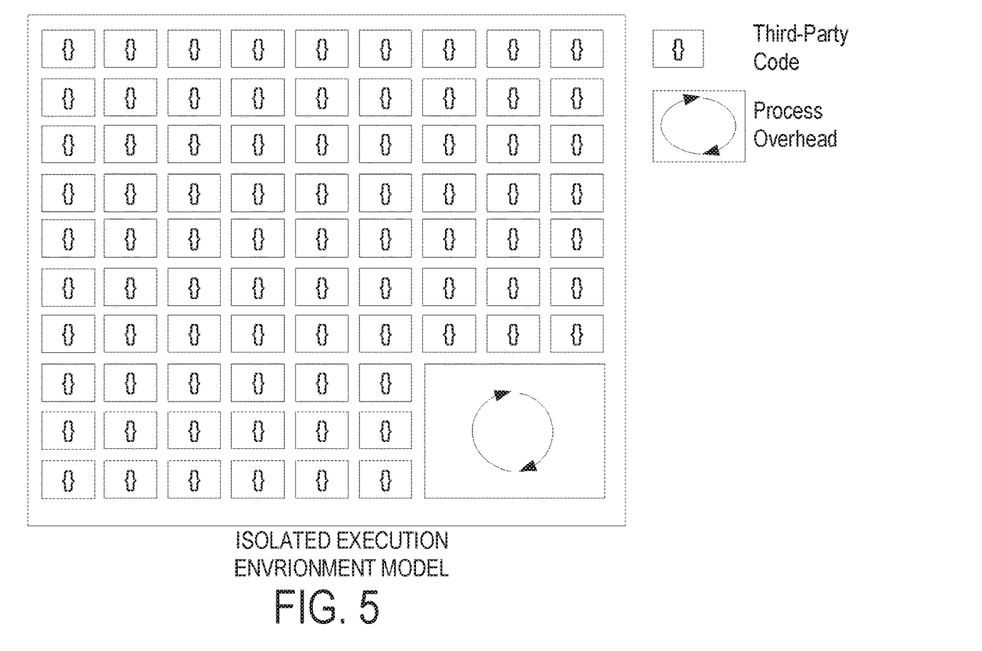
FIG. 5 is a conceptual figure that shows a conceptual relationship between third-party code and the process overhead of the isolated execution environment model that is described in the embodiments.

FIG. 5 is a conceptual figure that shows a conceptual relationship between third-party code and the process overhead of the isolated execution environment model that is described in embodiments herein. As shown, the isolated execution environment can include any number of third-party codes being managed as a set with a single process overhead. These third-party codes can be worker scripts such as the response inspector or similar code.

Figure 6:
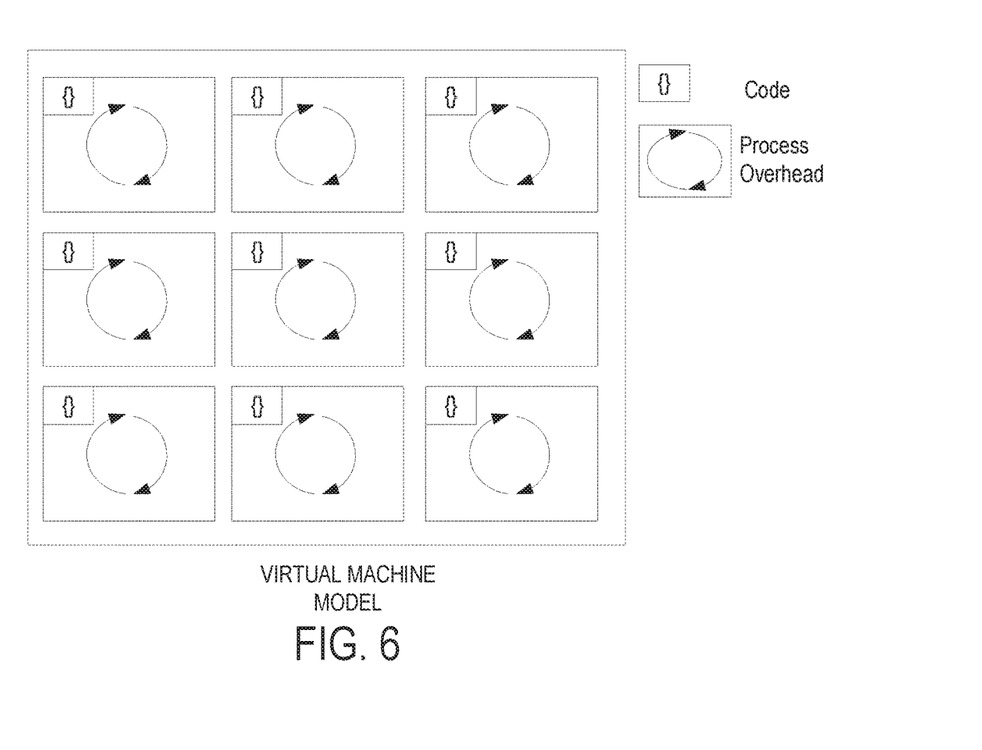
FIG. 6 is a conceptual figure that shows a conceptual relationship between code and the process overhead of a virtual machine model.

FIG. 6 is a conceptual figure that shows a conceptual relationship between code and the process overhead of a virtual machine model by way of comparison. As seen in FIGS. 5 and 6, the process overhead of the virtual machine model is experienced for each different code executed (a new process has to be started for each different code piece), whereas the process overhead of the isolated execution environment model is experienced once.

Figure 7:
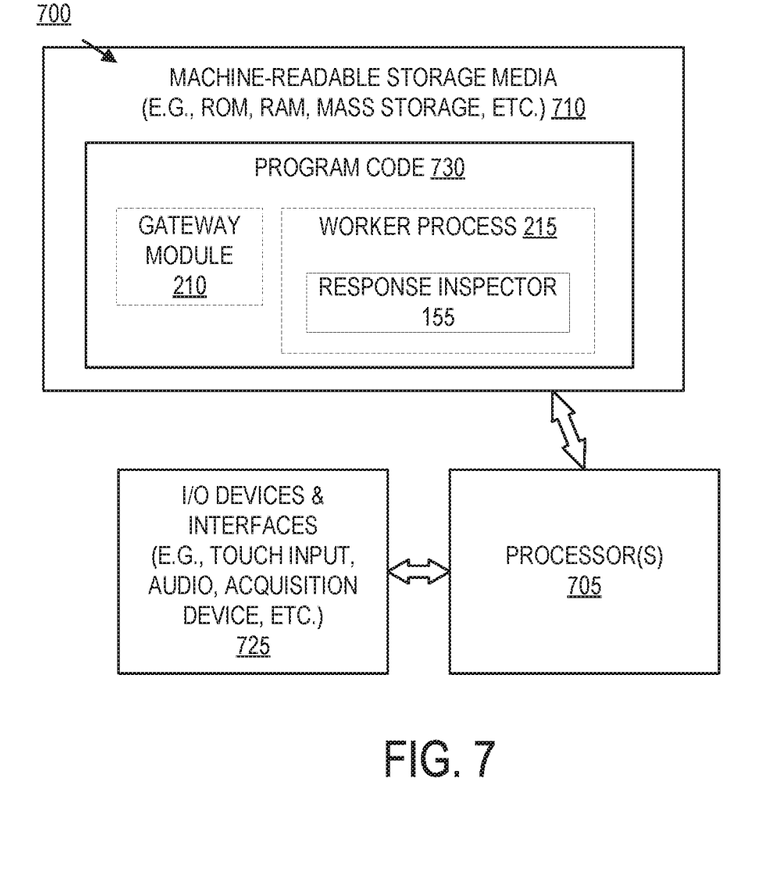
FIG. 7 illustrates a block diagram for an exemplary data processing system that may be used in some embodiments.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the compute server, control server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the gateway module 210 and/or the worker process(es) 215 including response inspectors 155 as described herein.

The data processing system 700 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the compute server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a first compute server of a plurality of compute servers, a request from a client device, where the plurality of compute servers are part of a distributed cloud computing platform, and wherein the request is a request for a network resource;
   executing, by a single process at the first compute server, a response inspector, wherein the response inspector is run in a one of a plurality of isolated execution environments;
   receiving, by the response inspector, at least one content item of the network resource from an origin server in response to the request for the network resource;
   detecting, by the response inspector, a protected content marker in the at least one content item that indicates a data breach; and
   logging, by the response inspector, information about the request in an inspection log.

2. The method of claim 1, further comprising:
sending a notification of the data breach to a customer of the distributed cloud computing platform.

3. The method of claim 1, further comprising:
generating a replacement response by the response inspector responsive to the detecting of the protected content marker, where the replacement response omits the at least one content item with the protected content marker.

4. The method of claim 1, wherein executing the response inspector causes at least one sub-request to be generated and transmitted to the origin server for the at least one content item.

5. The method of claim 1, further comprising:
forwarding log information to a control server to be aggregated with other log information for a customer of the distributed cloud computing platform.

6. The method of claim 1, wherein the protected content marker is any one or more of a texts string, a token, data structure, schema definition, or a watermark.

7. The method of claim 1, wherein the response inspector can be configured by the customer via a control server to identify a set of protected content markers.

8. A non-transitory machine-readable storage medium of a first one of a plurality of compute servers that provides instructions that, when executed by a processor, cause the processor to perform operations comprising:
receiving, at a first compute server of a plurality of compute servers, a request from a client device, where the plurality of compute servers are part of a distributed cloud computing platform, and wherein the request is a request for a network resource;
executing, by a single process at the first compute server, a response inspector, wherein the response inspector is run in a one of a plurality of isolated execution environments;
receiving, by the response inspector, at least one content item of the network resource from an origin server in response to the request for the network resource;
detecting, by the response inspector, a protected content marker in the at least one content item that indicates a data breach; and
logging, by the response inspector, information about the request in an inspection log.

9. The non-transitory machine-readable storage medium of claim 8, wherein the operations further comprise:
sending a notification of the data breach to a customer of the distributed cloud computing platform.

10. The non-transitory machine-readable storage medium of claim 8, wherein the operations further comprise:
generating a replacement response by the response inspector responsive to the detecting of the protected content marker, where the replacement response omits the at least one content item with the protected content marker.

11. The non-transitory machine-readable storage medium of claim 8, wherein executing the response inspector causes at least one sub-request to be generated and transmitted to the origin server for the at least one content item.

12. The non-transitory machine-readable storage medium of claim 8, wherein the operations further comprise:
forwarding log information to a control server to be aggregated with other log information for a customer of the distributed cloud computing platform.

13. The non-transitory machine-readable storage medium of claim 8, wherein the protected content marker is any one or more of a texts string, a token, data structure, schema definition, or a watermark.

14. The non-transitory machine-readable storage medium of claim 8, wherein the response inspector can be configured by the customer via a control server to identify a set of protected content markers.

15. A compute server, comprising:
a set of one or more processors; and
a non-transitory machine-readable storage medium that provides instructions that, when executed by the set of processors, cause the set of processors to perform the following operations:
receive, at a first compute server of a plurality of compute servers, a request from a client device, where the plurality of compute servers are part of a distributed cloud computing platform, and wherein the request is a request for a network resource;
execute, by a single process at the first compute server, a response inspector, wherein the response inspector is run in a one of a plurality of isolated execution environments;
receive, by the response inspector, at least one content item of the network resource from an origin server in response to the request for the network resource;
detect, by the response inspector, a protected content marker in the at least one content item that indicates a data breach; and
log, by the response inspector, information about the request in an inspection log.

16. The compute server of claim 15, wherein the operations further comprise:
sending a notification of the data breach to a customer of the distributed cloud computing platform.

17. The compute server of claim 15, wherein the operations further comprise:
generating a replacement response by the response inspector responsive to the detecting of the protected content marker, where the replacement response omits the at least one content item with the protected content marker.

18. The compute server of claim 15, wherein executing the response inspector causes at least one sub-request to be generated and transmitted to the origin server for the at least one content item.

19. The compute server of claim 15, wherein the operations further comprise:
forwarding log information to a control server to be aggregated with other log information for a customer of the distributed cloud computing platform.

20. The compute server of claim 15, wherein the protected content marker is any one or more of a texts string, a token, data structure, schema definition, or a watermark.

21. The compute server of claim 15, wherein the response inspector can be configured by the customer via a control server to identify a set of protected content markers.

* * * * *